J. M. Cooper.
Earth Auger.
Nº 2,807.   Patented Oct. 7, 1842.
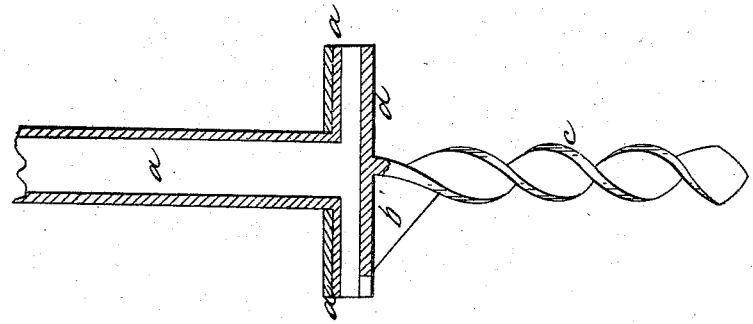
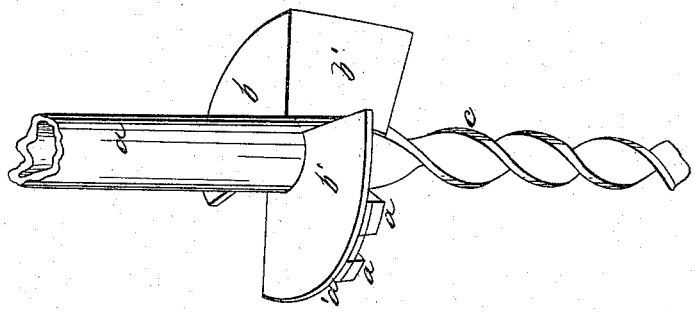

UNITED STATES PATENT OFFICE.

JNO. M. COOPER, OF NEWBERN, ALABAMA.

AUGER FOR BORING EARTH.

Specification of Letters Patent No. 2,807, dated October 7, 1842.

*To all whom it may concern:*

Be it known that I, JOHN M. COOPER, of Newbern, county of Greene, and State of Alabama, have invented a new and Improved Auger for Boring Earth in Sinking Wells, &c., and that the following is a full, clear, and exact description thereof, reference being had to the accompanying drawing, making a part of this specification, in which—

Figure 1, is a perspective view; Fig. 2, a section longitudinally through the center.

On the lower end of a tube (*a*), of any required length, are two projections (*a' a'*), on each side, at right angles to the tube, to which I affix two plates (*b*) horizontally, occupying a little more than a quarter of a circle on each side; one end of each of these plates is bent down and assumes a spiral form as shown at (*b'*), the lower edges being sharpened so as to cut; a center worm (*c*) formed similar to a common auger has a cross piece (*d*) at its upper end, with a groove in the upper side running its whole length, the extremities being notched out the width of the groove at the bottom; this cross piece is firmly riveted to the projection (*a' a'*) with the worm directly under the center of the tube; the groove being connected therewith; it will thus be obvious, that whatever the amount of the load is above the plates (*b*), there will be a constant communication preserved between the superincumbent air and the under side of the plates (*b*) thus relieving the auger of the pressure of the air in drawing it out, if the tube is filled with water, the chalk, clay &c. which is being bored will always be kept wet at the point where the cutters are acting. The tube (*a*) is connected with the boring rods in any of the usual methods; by this arrangement a greater load may be raised, than in any other way by the same power, and the auger be made to cut much more easily.

What I claim as my invention and desire to secure by Letters Patent, is—

The combination and arrangement of the hollow tube (*a*) and grooved cross piece (*d*) with the boring apparatus so as to keep up a communication between the superincumbent air, or water, in the shaft, and the underside of the plate (*b*), all as herein described.

JOHN M. COOPER.

Witnesses:
TH. R. BORDEN,
ALFRED SEXTON,